United States Patent
Fiorotto et al.

(10) Patent No.: US 9,901,894 B2
(45) Date of Patent: Feb. 27, 2018

(54) ENERGY RECOVERY SYSTEM AND METHOD AND POLYMERIZATION PLANT WITH SUCH A RECOVERY SYSTEM

(71) Applicant: Versalis S.P.A., S. Donato Mil.se (IT)

(72) Inventors: Nicola Fiorotto, Curtatone (IT); Gianni Marchetti, Mantova (IT); Matteo Gheno, San Zeno di Cassola (IT)

(73) Assignee: Versalis S.p.A., San Donato Milanese (IT)

( * ) Notice: Subject to any disclaimer, the term of this patent is extended or adjusted under 35 U.S.C. 154(b) by 0 days.

(21) Appl. No.: 14/427,788

(22) PCT Filed: Oct. 22, 2013

(86) PCT No.: PCT/EP2013/072066
§ 371 (c)(1),
(2) Date: Mar. 12, 2015

(87) PCT Pub. No.: WO2014/067815
PCT Pub. Date: May 8, 2014

(65) Prior Publication Data
US 2015/0338172 A1 Nov. 26, 2015

(30) Foreign Application Priority Data
Oct. 31, 2012 (IT) .............................. MI2012A1866

(51) Int. Cl.
*F28D 17/00* (2006.01)
*B01J 19/00* (2006.01)
(Continued)

(52) U.S. Cl.
CPC ........... *B01J 19/0013* (2013.01); *B01J 19/18* (2013.01); *C08F 2/00* (2013.01); *F28D 15/00* (2013.01);
(Continued)

(58) Field of Classification Search
CPC ........ F28D 20/021; F28D 20/60; F28D 21/00; F28D 15/00; F28D 20/02; B21D 37/16; F25B 23/00; F25B 6/02
(Continued)

(56) References Cited

U.S. PATENT DOCUMENTS

| 2,371,381 | A | 3/1945 | Campbell et al. |
| 4,421,661 | A | 12/1983 | Claar et al. |
| 4,628,869 | A | 12/1986 | Symsek et al. |
| 8,522,859 | B2 * | 9/2013 | Moilala ................. F24F 5/0017 165/10 |

(Continued)

FOREIGN PATENT DOCUMENTS

| DE | 3025520 A1 | 1/1982 |
| FR | 2296824 A1 | 7/1976 |

(Continued)

OTHER PUBLICATIONS

International Search Report dated Jan. 8, 2014 for PCT/EP2013/072066.

*Primary Examiner* — Davis Hwu
(74) *Attorney, Agent, or Firm* — Abel Law Group, LLP

(57) ABSTRACT

The present invention relates to a system for energy recovery and a polymerization plant having such a system comprising a. an exothermic device operating continuously (exothermic device interpreted as any apparatus able to produce heat and transfer it onto another body), b. a cooling device in fluid communication with said exothermic device, c. an endothermic device operating discontinuously (endothermic device interpreted as any apparatus able to receive heat from another body, i.e. to be heated); said system being characterized in that it comprises a device for the accumulation of the energy produced by the exothermic device in fluid communication with the discontinuous endothermic device, the exothermic device operating continuously and the cooling device using a service fluid.

5 Claims, 2 Drawing Sheets

(51) Int. Cl.
*F28D 21/00* (2006.01)
*F28D 15/00* (2006.01)
*B01J 19/18* (2006.01)
*C08F 2/00* (2006.01)
*F28D 20/00* (2006.01)

(52) U.S. Cl.
CPC ............. *F28D 20/00* (2013.01); *F28D 21/00* (2013.01); *F28D 21/001* (2013.01); *B01J 2219/00029* (2013.01); *B01J 2219/00094* (2013.01); *F28D 2021/0022* (2013.01); *Y02E 60/142* (2013.01); *Y02P 20/124* (2015.11)

(58) Field of Classification Search
USPC ........................ 165/10, 109.1, 54, 104.14
See application file for complete search history.

(56) References Cited

U.S. PATENT DOCUMENTS

| | | | |
|---|---|---|---|
| 2011/0005562 A1* | 1/2011 | Bisges | F24D 17/0021 |
| | | | 136/206 |
| 2011/0162829 A1 | 7/2011 | Xiang | |
| 2011/0172382 A1* | 7/2011 | Yeh | B01J 19/002 |
| | | | 526/282 |

FOREIGN PATENT DOCUMENTS

| | | |
|---|---|---|
| GB | 2352805 A | 2/2001 |
| JP | S56155388 A | 12/1981 |
| WO | 2012101110 A1 | 8/2012 |

* cited by examiner

ENERGY RECOVERY SYSTEM AND METHOD AND POLYMERIZATION PLANT WITH SUCH A RECOVERY SYSTEM

The present invention relates to a system and method for the recovery of energy in a plant in order to improve its energy efficiency. More specifically, said system and said method allow the energy produced by an exothermic unit operating in continuous to be transferred towards an endothermic unit operating in discontinuous (batchwise). One of the possible applications of the present invention is in polymerization processes and in particular in production processes of polymeric resins containing rubber.

In production plants of thermoplastic polymers, for the control of the temperature inside the reactors, a fluid is used which acts as "heat carrier", absorbing the energy generated and then transferring it to the environment before being re-sent to the reactors. In order to increase the energy efficiency of the plant, the reaction heat can be used for providing the heating of the endothermic operating units, at temperatures lower than the reaction temperature.

The production of polymeric resins containing rubber (such as, for example, ABS and HIPS) with the mass continuous technology, requires that the rubber be dissolved in a solvent, before being fed to the reaction area. Solvents normally used are the starting monomers of the polymeric resins produced, but also other liquids which, once fed to the reaction area, allow the reaction rate to be effectively controlled in order to obtain the end-product. The dissolution phase of the rubber represents an important step in the preparation process of the raw materials to allow the polymer to be obtained with the desired characteristics.

This phase is carried out batchwise and follows a specific procedure which comprises a charging phase of the solvent into the dissolution container, a heating phase of the solvent to the desired dissolution temperature, a grinding phase of the rubber and charging of the same into the container containing the solvent. Once the rubber has been charged, the system is left for the time necessary for allowing the rubber to be dissolved in the solvent. During the heating phase of the solvent in the dissolution step of the rubber, greater energy is required than that generated in continuous by the reaction. The technology currently used for heating the dissolution solvent envisages that said solvent can be heated in two different ways. The first way is to pass the solvent through an exchanger before being fed to the dissolution container; the second way is to heat the mixture of solvent and rubber through the surface of the dissolution container. In both cases, low-pressure steam is used as heat carrier fluid.

The low-pressure steam is produced outside the battery limits in a polymerization plant, and using energy outside the plant itself. In a polymerization plant, the service fluids used for cooling never reach the temperatures typical of low-pressure steam. Consequently, it is not possible in the current state of the art to exploit the reaction heat of a polymerization process for generating low-pressure steam and thus heating the solvent.

Furthermore, in order to shorten the cycle times of the dissolution and reduce the volume of the equipment in this section, the heating time of the solvent must be reduced to the minimum. Heating the solvent further accelerates the dissolution phase of the rubber. This ensures that the heat necessary for heating the dissolution section of the rubber in a short time is greater than that produced in continuous in the reaction area.

The energy developed during the polymerization could be specifically exploited in the heating of the dissolution solvent of the rubbers. The thermal integration between the dissolution area and the reaction area, however, requires that a batch endothermic operation (i.e. the dissolution of the rubber) be coupled with a continuous exothermic operation (the polymerization reaction). For the reasons explained above, it is difficult to couple the reaction section operating in continuous with the dissolution section of the rubber operating batchwise, thus limiting the possibilities of energy recovery.

Thus it arise the necessity of combining a batch endothermic operation with a continuous exothermic operation, improving the energy efficiency of the plants involved.

In order to overcome the critical aspects described above, the Applicant has defined a section of the plant to be dedicated to the storage of the energy developed ("heat storing area") by an exothermic unit, from which heat can be drawn, when necessary, for effecting heating to temperatures lower than that of the exothermic unit. This section comprises an accumulation device which is inserted between a continuous exothermic operation and a batch endothermic operation. The energy developed in an exothermic unit, preferably heat, is transferred to the accumulation device by means of a service fluid which serves the exothermic unit. This service fluid is stored in the accumulation device and heated therein in the production moments of energy. A part of it is therefore removed to provide heat.

In this way, the energy efficiency of a plant can be improved, in particular a polymerization plant, thus integrating a batch endothermic operation with a continuous exothermic operation.

Further objectives and advantages of the present invention will appear more evident from the following description and enclosed drawings, provided for purely illustrative and non-limiting purposes.

FIG. 1 illustrates the system, object of the present invention, in which: 1 is the energy accumulation device, 2 is the cooling device, 3 is the exothermic device which operates in continuous, 4 is the endothermic device which operates batchwise; A, B and C are hot service fluids; D and E are cold service fluids.

Figure 3:
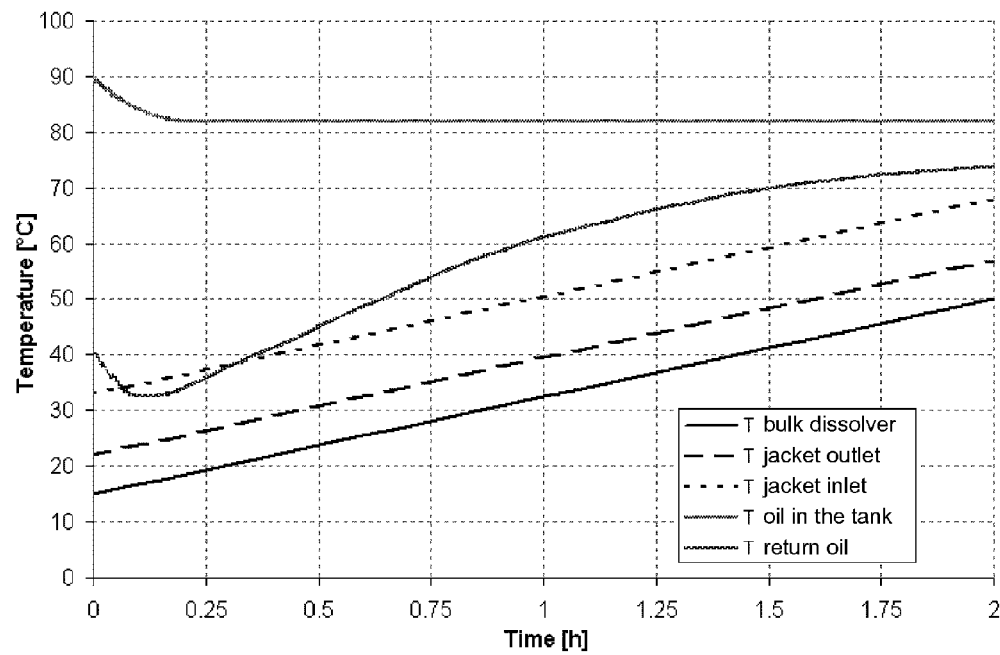
FIG. 3 illustrates the results of the simulation in terms of temperatures of the streams of diathermic oil, demi water and process fluid inside the dissolver according to the example.

In FIG. 3:
T bulk dissolver: temperatures of the process fluid inside the dissolver;
T jacket inlet: temperature of the demi water at the inlet of the jacket of the dissolver, is the temperature of the water after being heated by the diathermic oil;
T jacket outlet: temperature of the demi water at the outlet of the jacket of the dissolver, is the temperature of the water at the inlet of the water-oil exchanger;
T oil in the tank: temperature of the diathermic oil inside the tank (in the previous scheme it is stream "C" as this stream takes the oil from the tank);
T return oil: temperature of the diathermic oil after heating the demi water (in the previous scheme it is stream "E").

Figure 4:
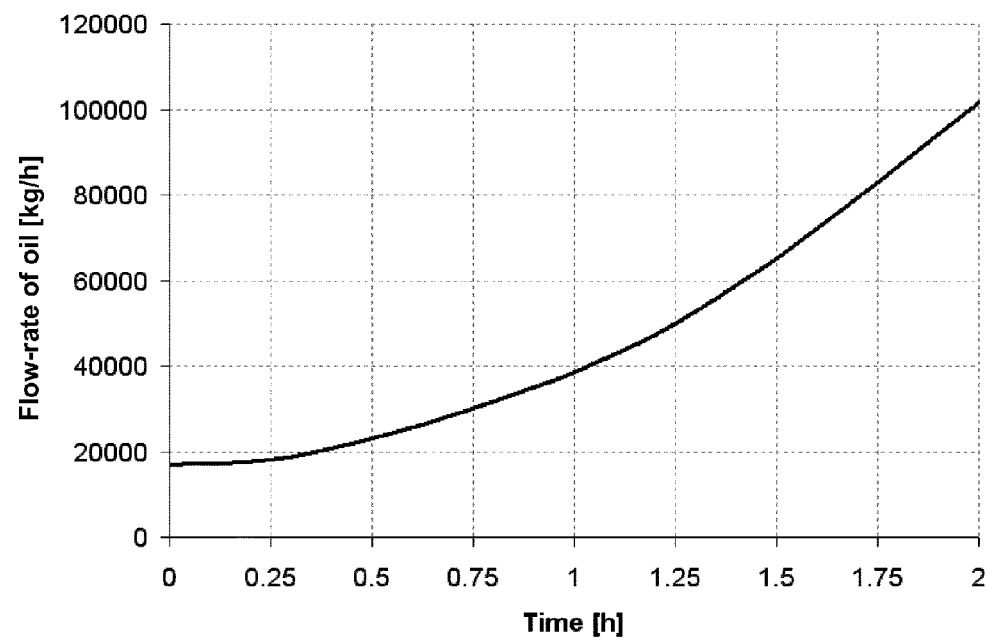

FIG. 4 illustrates the flow-rate of oil to be sent to the exchanger to carry out the heating of the rubber dissolution section according to the example.

DETAILED DESCRIPTION

An object of the present invention therefore relates to a particular system for energy recovery in which a batch endothermic unit is coupled with an exothermic unit which operates in continuous. Said system comprises:
  a. an exothermic device (3) operating in continuous,
  b. a cooling device (2) in fluid communication with said exothermic device,
  c. an endothermic device operating in discontinuous (batchwise) (4),
said system being characterized in that it comprises a device (1) for the accumulation of the energy produced by the exothermic device ("heat storing area") in fluid communication with the batch endothermic device, the exothermic device operating in continuous and the cooling device using a service fluid.

For the purposes of the present invention, the term "comprise" or "include" also comprises the case "essentially consisting of" or "only consisting in".

The exothermic device preferably has a temperature profile varying within the range of 80° C. to 160° C.

The service fluid inside the accumulation device is preferably at a temperature higher than or equal to 80° C.

The exothermic device operating in continuous develops thermal energy which can only be used at a lower thermal level: the energy absorbed by the cooling fluid of the unit operating in continuous can only be used for heating a second fluid up to a temperature lower than that of the service fluid.

The service fluid can be removed from the energy accumulation device and sent to the various sections of a plant that must be heated, either in continuous or batchwise, without disturbing the other devices.

When the batch operations do not require thermal energy, energy accumulates inside the accumulation device, preferably the reaction heat of a polymerization process, increasing the temperature of the service fluid contained therein, said device always being in continuous fluid communication with the exothermic device. When the service fluid is distributed to the various sections of the plant, the temperature in the accumulation device decreases.

The temperature of the energy accumulation device depends on the temperature or temperature profile in the exothermic device (for example the polymerization temperature), the number and type of utilities that require heat within a process and the configuration of the plant in which it is inserted.

Simulations carried out for dimensioning the accumulation device allow the temperature of the service fluid to be determined inside said device. Preferably, in processes for the production of polymeric resins containing rubber, more preferably ABS or HIPS, for reasons of thermal exchange, it has been determined that the temperature of the service fluid inside said device must not be lower than 80° C. In these specific applications, the streams of fluid that leave or return to the accumulation device must ensure that the temperature does not fall below 80° C.

If the temperature within the heat storing area falls below 80° C., the temperature delta available for effecting the heating services is lowered, thus increasing the time necessary for effecting the same heating services or even making them impossible.

The system, object of the present invention, may preferably be used in a polymerization process for the production of resins containing rubbers and has the purpose of recovering the reaction enthalpy (reaction heat), which will be exploited for heating the dissolution solvent of the rubbers.

The exothermic device is preferably a reaction section of a polymerization process, more preferably a polymerization process for producing polymeric resins containing rubbers. The endothermic device is preferably a solvent dissolution section of rubber in a polymerization process for producing resins containing rubbers.

The present invention preferably relates to an energy recovery system in a polymerization plant for producing resins containing rubbers, said system comprising:
  an exothermic reaction section operating in continuous, preferably having an increasing temperature profile within the range of 80° C.-160° C.,
  a cooling section in fluid communication with said reaction section,
  a solvent dissolution section of rubbers operating in batchwise,
said system being characterized in that it comprises an accumulation device of the energy produced by the reaction section, wherein the service fluid is at a temperature higher than or equal to 80° C., wherein said accumulation device is in fluid communication with the dissolution section of a rubber, with the reaction section and with the cooling device using a service fluid.

A further object of the present invention relates to a method for recovering the energy developed in an exothermic device of the system described and claimed in the present text, which operates in continuous. Said method comprises the following phases:
  i) heating a first service fluid by exploiting the energy developed by an exothermic unit operating in continuous (3), thus forming a first hot service fluid (B),
  ii) sending said first hot service fluid (B) to an energy accumulation device (1),
  iii) extracting at least a second hot service fluid (A and C) from the energy accumulation device and sending it, in continuous, to a cooling section (2), or batchwise to an endothermic device operating batchwise (4).

The present invention preferably relates to a method for recovering the reaction enthalpy developed during a polymerization reaction for producing resins containing rubbers, through the system described and claimed in the present text. Said method comprises the following phases:
  heating a first service fluid by exploiting the reaction enthalpy developed during a polymerization reaction,
  sending said first hot service fluid to an enthalpy accumulation device,
  extracting at least a second hot service fluid from the enthalpy accumulation device and sending it, in continuous, to a cooling section, or batchwise to a rubber dissolution section with solvent.

A further step comprises the possibility of extracting at least a third cold fluid from the endothermic device, which will be sent to the accumulation device for integrating its level.

The first service fluid comes from a cooling section in fluid communication with the accumulation device and with the exothermic device.

In polymerization processes for producing resins containing rubbers, the first service fluid, which serves the exothermic reaction section, is initially at a temperature ranging from 60° C. to 75° C. and is heated to at least 90° C. thanks to the energy developed.

The advantages obtained by the present invention are:
combining a batch operation, such as the dissolution of rubber, with a continuous operation, such as the polymerization reaction,
recovering the reaction enthalpy and improving the energy efficiency of the whole polymerization process.

By applying this energy recovery system, about 5% of the total heat required by the process can be saved.

Particular applications of the method described and claimed are polymerization processes starting from styrene or ethylbenzene, for reasons of safety, or mixtures of styrene, ethylbenzene and acrylonitrile.

All the service fluids used for the purposes of the present invention act as heat carriers. Preferred service fluids are selected from diathermic oil and demineralized water. Service fluids that cannot be used in the present invention are all fluids which vaporize under the operating conditions.

The accumulation device of thermal energy is preferably a tank whose correct dimensioning allows the purposes of the present invention to be achieved.

The dimensioning of the tank must be effected taking into consideration the utilities using the service fluid, the thermal dispersions, the plant layout and safety of the process.

EXAMPLE

A simulation was carried out to see whether or not the heat subtracted from diathermic oil, for heating the rubber dissolution section in a polymerization process for the production of polymeric resins containing rubbers, makes the temperature inside the cold oil tank fall below the limit of 80° C. The reference process scheme is FIG. 2.

Figure 1:
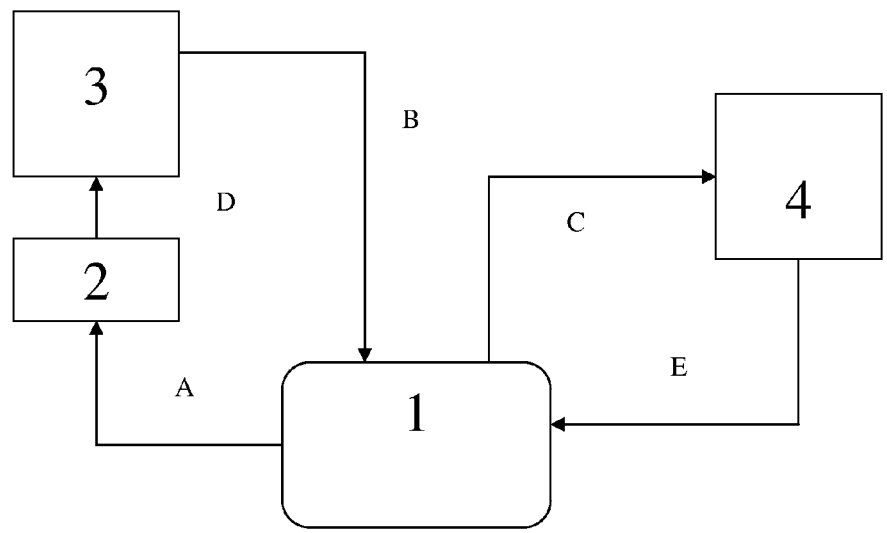
Figure 2:
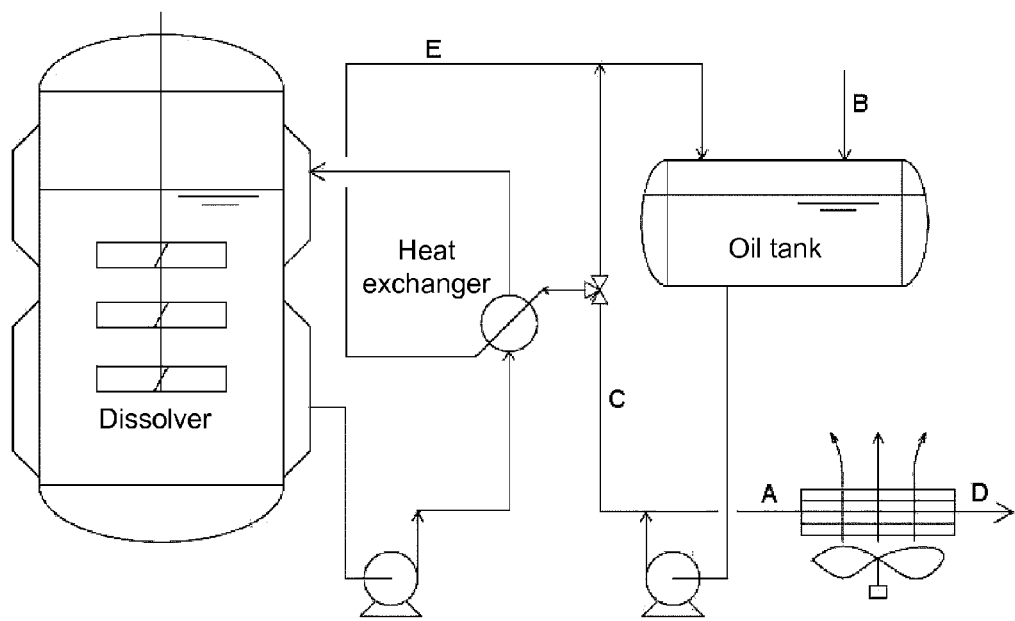
FIG. 2 illustrates a particular application of the present invention described in the example, but whose references are the same as FIG. 1.

In FIG. 2, the indexes A, B and C correspond to hot service fluids; D and E are cold service fluids; the dissolver corresponds to the endothermic device operating batchwise; the oil tank corresponds to the thermal accumulation device; finally the heat exchanger is the cooling device.

The temperature inside the dissolver must be brought from 15° C. to 50° C. in 2 hours. To allow this, demineralized water is circulated in the jacket of the dissolver. The demineralized water must be heated by the diathermic oil and then in turn transfers heat to the process fluid inside the dissolver.

For this simulation, a cautionary situation was considered, in which, at the beginning of the heating cycle of the rubber dissolution, the temperature of the oil inside the tank is 90° C. (it would be advantageous if it were higher).

The mass of oil present inside the tank is considered to be 6,000 kg. The level inside the tank always remains constant as the circulation pump of the oil continuously sends diathermic oil to the reaction section and dissolution. The diathermic oil is cooled in the dissolution section only during the heating phases of the dissolver, as otherwise, it is not fed to the heat exchanger (the heat exchanger is normally bypassed thanks to a three-way valve).

A stream of oil coming from the reaction area reaches the same tank (stream "B" in the scheme at the top). The flow-rate of this stream is 120,000 kg/h and its temperature is 90° C. (this is the stream that ensures that at the beginning of the heating cycle in the rubber dissolution phase, the temperature inside the oil tank is 90° C.)

It was decided to effect regular heatings of the fluid inside the dissolver, thus keeping the heat to be transferred by the diathermic oil to the rubber dissolution system constant during the 2 hours in which the heating of the rubber dissolution is effected.

The variable with which it is possible to intervene and assign the heat to be exchanged, is the flow-rate of oil to the heat exchanger. The driving force of the heat exchange between water and oil is the difference in temperature between these two fluids. As this difference is greater at the beginning of the heating phase than at the end, in order to always transfer the same energy to the rubber dissolution system, the flow-rate of the oil sent to the exchanger is varied.

As far as the heat exchange between demineralized water and dissolver is concerned, on the other hand, as the water flow-rate is constant, the heating rate of the dissolver is selected imposing an adequate temperature difference between demineralized water and process fluid inside the dissolver. It is possible to intervene on this temperature difference by heating more or less the demineralized water by means of diathermic oil.

FIG. 3 indicates the results of the simulation in terms of temperatures of the streams of diathermic oil, demi water and process fluid inside the dissolver.

As can be observed from the graph of FIG. 3, the constant temperature differences between "T bulk dissolver", "T jacket inlet" and "T jacket outlet" indicate that the heating of the rubber dissolution section is taking place regularly.

The "T return oil", on the other hand, has a strange trend as, at the beginning, a low flow-rate of diathermic oil is fed to the heat exchanger, which is significantly cooled, then with a decrease in the temperature difference between demi water and diathermic oil, the oil flow-rate to the exchanger must be increased to transfer the same energy. The increase in the oil flow-rate ensures that this is cooled less (the heat transferred is constant but the oil is cooled less as the flow-rate increases).

With respect to the temperature of the oil in the tank, on the other hand, at the beginning, a decrease from 90° C. (initial value) to about 82° C. is observed. This decrease in temperature occurs in about 0.25 hours. The temperature of the diathermic oil inside the tank subsequently remains constant at 82° C. This decrease in temperature is due to the fact that two streams are mixed in the tank, stream "B" and that coming from the rubber dissolution section (sum of "E" and the stream which bypasses the exchanger). Before the beginning of the dissolution cycle, this second stream does not transfer heat and therefore returns to the tank at the initial temperature of 90° C. When the heating is started for the dissolution of the rubber, however, this stream is cooled, consequently also cooling the oil present in the tank. At a certain point (almost immediately), a new stationary state is reached, as the heating rate of the rubber dissolution section is constant.

An important reason for effecting the heating of the rubber dissolution regularly is the following: if the maximum flow-rate of oil to the exchanger were always fed to the exchanger, at the beginning of the heating phase, the heat exchanged would be extremely high (thanks to the high temperature difference between oil and demi water), thus causing an equally significant temperature decrease of the oil inside the tank. This would represent a problem as it would disturb the polymerization section.

FIG. 4 shows the flow-rate of oil to be sent to the exchanger for effecting the heating of the rubber dissolution section regularly.

100,000 kg/h of oil are always sent to the rubber dissolution section, but the flow-rate that passes through the exchanger during the heating cycle is that indicated by the above figure.

The invention claimed is:

1. A method for the recovery of the energy developed in at least an exothermic polymerization reactor, operating continuously, said method comprising the following steps:
   i. heating a first service fluid by exploiting the energy developed by an exothermic polymerization section in a polymerization process for producing resins containing rubbers operating continuously, thus forming a first hot service fluid,
   ii. sending said first hot service fluid to an energy accumulation device,
   iii. extracting at least a second hot service fluid from the energy accumulation device and sending it, continuously, to a cooling section, or discontinuously, to an endothermic device operating discontinuously wherein endothermic processes occur, wherein a third cold fluid, extracted from the endothermic device operating discontinuously wherein endothermic processes occur, is sent to the energy accumulation device.

2. The method according to claim 1, wherein the endothermic device operating discontinuously wherein endothermic processes occur, is the solvent dissolution section of the rubber in the polymerization process for producing resins containing rubbers.

3. The method according to claim 1 wherein the exothermic polymerization section has a temperature profile ranging from 80° C. to 160° C.

4. The method according to claim 1 wherein the service fluid inside the energy accumulation device is at a temperature higher than or equal to 80° C.

5. A method according to claim 1 wherein the polymerization process starts from styrene, ethylbenzene or a mixture of styrene, ethylbenzene and acrylonitrile.

* * * * *